United States Patent
Takahashi et al.

(10) Patent No.: US 6,756,761 B2
(45) Date of Patent: Jun. 29, 2004

(54) VEHICULAR GENERATOR CONTROL SYSTEM AND METHOD RESPONSIVE TO EXTERNAL SIGNALS

(75) Inventors: Keiji Takahashi, Kariya (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/173,772

(22) Filed: Jun. 19, 2002

(65) Prior Publication Data
US 2003/0015986 A1 Jan. 23, 2003

(30) Foreign Application Priority Data
Jul. 17, 2001 (JP) ........................................ 2001-217252

(51) Int. Cl.[7] ............................................. G05B 11/28
(52) U.S. Cl. ..................... 318/599; 318/560; 318/580; 318/567; 322/28; 322/17
(58) Field of Search ........................... 322/28, 17, 44, 322/36, 29, 64; 318/254, 560, 580, 567, 599, 600–604, 799, 638, 811; 360/73.01; 340/640; 363/25; 323/204

(56) References Cited

U.S. PATENT DOCUMENTS

| | | | | |
|---|---|---|---|---|
| 4,178,628 A | * | 12/1979 | Shepard, Jr. ................. | 363/25 |
| 4,383,242 A | * | 5/1983 | Sassover et al. ............ | 307/10.5 |
| 4,713,741 A | * | 12/1987 | Yamada ....................... | 363/50 |
| 4,766,359 A | * | 8/1988 | Smith et al. ................. | 318/652 |
| 5,444,354 A | * | 8/1995 | Takahashi et al. ............ | 322/28 |
| 5,497,062 A | * | 3/1996 | Fenstermacher et al. ..... | 318/599 |
| 5,497,071 A | * | 3/1996 | Iwatani et al. ................ | 322/28 |
| 6,014,016 A | | 1/2000 | Maruyama et al. | |
| 6,137,247 A | | 10/2000 | Maehara et al. | |

* cited by examiner

Primary Examiner—Kimberly Lockett
Assistant Examiner—Renata McCloud
(74) Attorney, Agent, or Firm—Oliff & Berridge, PLC

(57) ABSTRACT

A voltage control system for a vehicular power generator includes a receiver unit that receives voltage pulse signals indicating characteristics of the voltage control system from an external device with stability. The device periodically reads two cycles of leading edges or trailing edges, or two periods of high level pulses or low level pulses. When a difference between the two cycles or periods is within a predetermined range, the indicated value of the present voltage pulse signal is used to control the power generator. When the difference is out of the predetermined range, the indicated value of the stored previous pulse signal is used instead.

14 Claims, 5 Drawing Sheets

US 6,756,761 B2

VEHICULAR GENERATOR CONTROL SYSTEM AND METHOD RESPONSIVE TO EXTERNAL SIGNALS

CROSS REFERENCE TO RELATED APPLICATION

This application is based on and incorporates herein by reference Japanese Patent Application No. 2001-217252 filed on Jul. 17, 2001.

FIELD OF THE INVENTION

The present invention relates to a vehicular generator control system and method that has capability of changing its characteristics based on external electrical signals.

BACKGROUND OF THE INVENTION

In a generator control system (regulator) for a vehicular alternating current power generator, a receiver unit is installed to communicate with external devices provided apart from the receiver unit. In such a regulator, it is proposed to control the characteristics of the regulator by indicating the characteristics with voltage pulse signals. In U.S. Pat. No. 6,014,016 (JP-A-10-51976), a regulator is constructed to receive signals indicating the regulator characteristics from an external device. In U.S. Pat. No. 6,137,247 (JP-A-11-262299), a regulator is constructed to change its characteristics in a wide range based on voltage pulse signals from an external device.

A generator is installed in an engine compartment of a vehicle. In the engine compartment, a large amount of electrical and magnetic noises are generated. Signals indicating the regulator characteristics from an external device need to be properly read by a receiver unit installed in the regulator even in such environment. Therefore, the receiver unit needs to be highly resistant to noise.

SUMMARY OF THE INVENTION

The present invention therefore has an objective to provide a vehicular generator control system (regulator) and method that uses signals indicating the regulator characteristics from an external device without being disturbed by transient noise.

The regulator of the present invention has a voltage control circuit and a receiver circuit. The voltage control circuit controls a field current of the generator so that an output voltage of the generator is regulated to a predetermined level. The receiver circuit periodically reads voltage pulse signals from an external device applied via a signal line.

Only when a variation in the voltage pulse width is within a predetermined range, the regulator controls the field current based on the characteristic values indicated with the pulse signal. As a result, the regulator can perform stable voltage control based on the indicated characteristics without being affected by transitory instability of the pulse signals.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings.

[First Embodiment]

Figure 1:
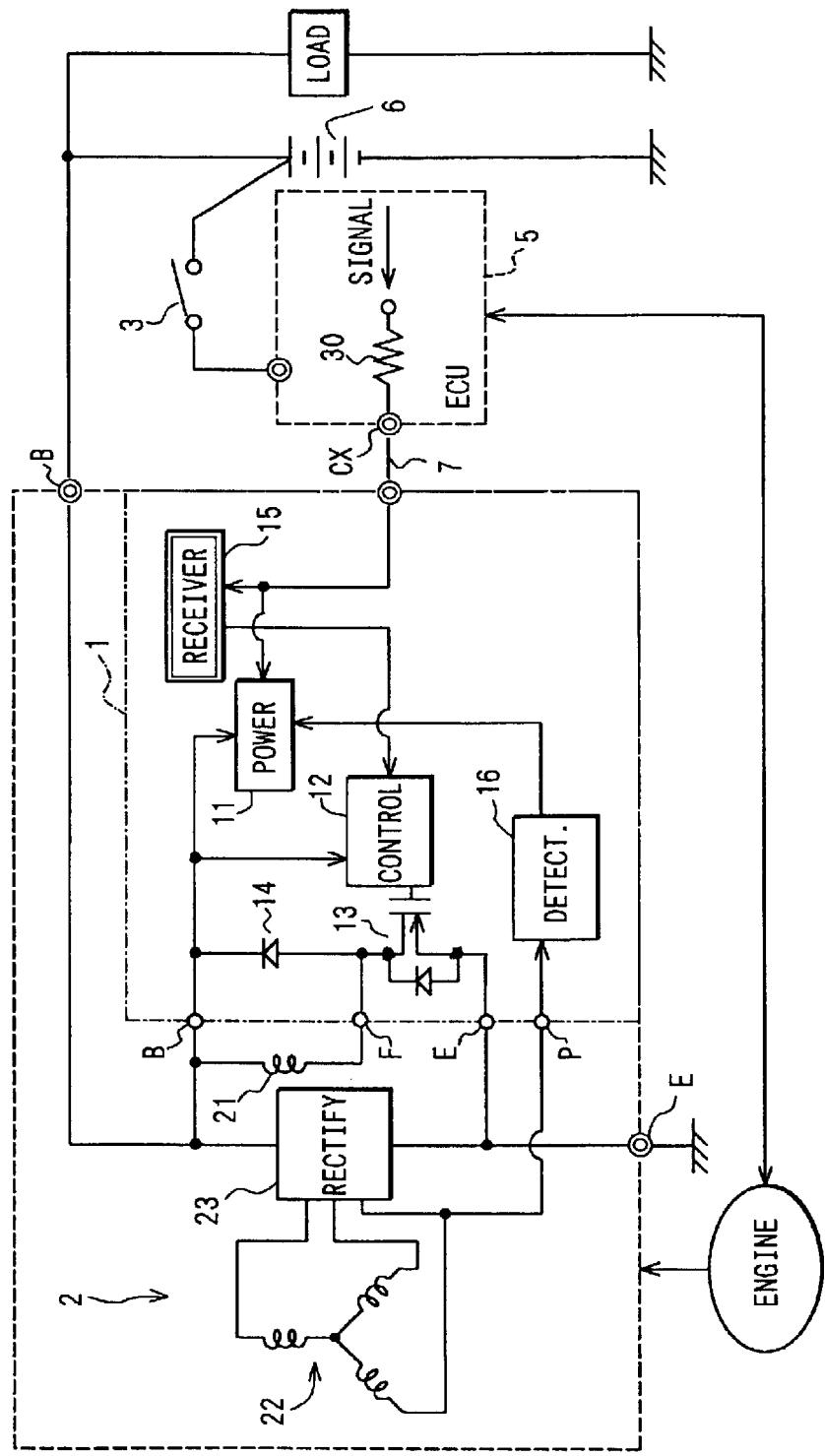
FIG. 1 is a circuit diagram showing a vehicular generator control system (regulator) according to the first embodiment of the present invention.

Referring to FIG. 1, a voltage regulator 1 has a power supply circuit 11, a power generation control circuit 12, a switching device 13, an external signal receiver circuit 15 and a power generation detecting circuit 16. The regulator 1 is connected to external devices, including an alternating current power generator 2 and an electronic control unit (ECU) 5. The generator 2 comprises a field coil 21, stator coils 22 and a rectifier circuit 23.

The regulator 1 regulates an output voltage of the generator 2 produced at a terminal B to a target voltage (e.g., 14 V). The ECU 5 outputs a voltage pulse signal to a terminal CX via an internal impedance 30 and a signal line 7. The pulse signal indicates the target voltage shown in FIG. 8 as the characteristics of the regulator 1. The terminal CX is an input/output terminal.

The ECU 5 is connected to a power supply (battery) 6 via an ignition switch 3. The switching device 13 is connected between terminals E and F, and controls power supply to the field coil 21 based on outputs from the control circuit 12. The terminals E and F are connected to a ground and the field coil 21, respectively.

The receiver circuit 15 receives a voltage value measured at the terminal CX and outputs the characteristics of the regulator 1 to the control circuit 12. The characteristic are indicated by a duty ratio of the switching device 13. By changing the characteristics, an output voltage of the stator coils 22 can be regulated. The detecting circuit 16 is connected to one of the stator coils 22 via a terminal P, detects power generation conditions, and outputs signals to the power supply circuit 11.

The characteristics are determined based on the pulse signals. The power supply circuit 11 supplies power to the control circuit 12 based on the voltage at the terminal CX and the output of the detecting circuit 16.

Figure 2:
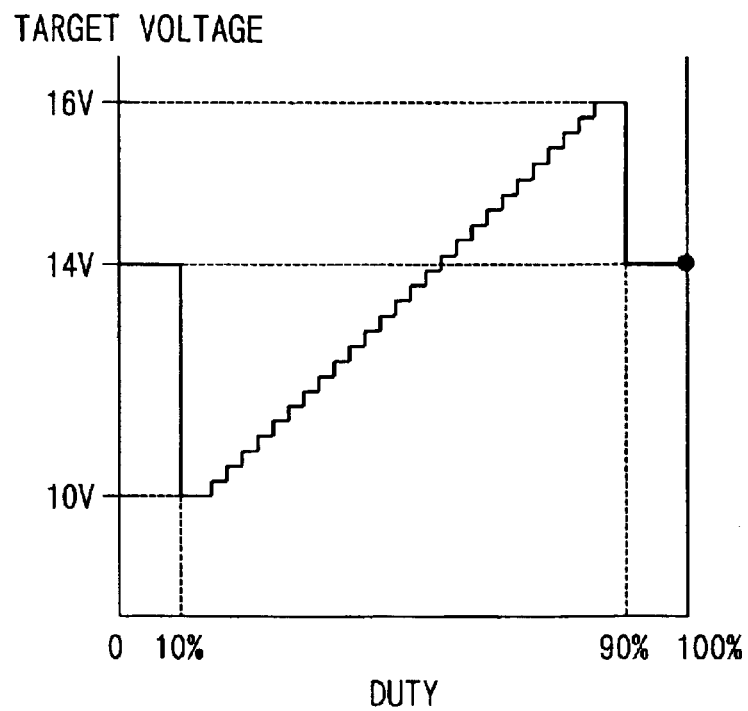
FIG. 2 is a characteristic curve of the regulator determined based on voltage pulse signals from external devices.
Figure 3:
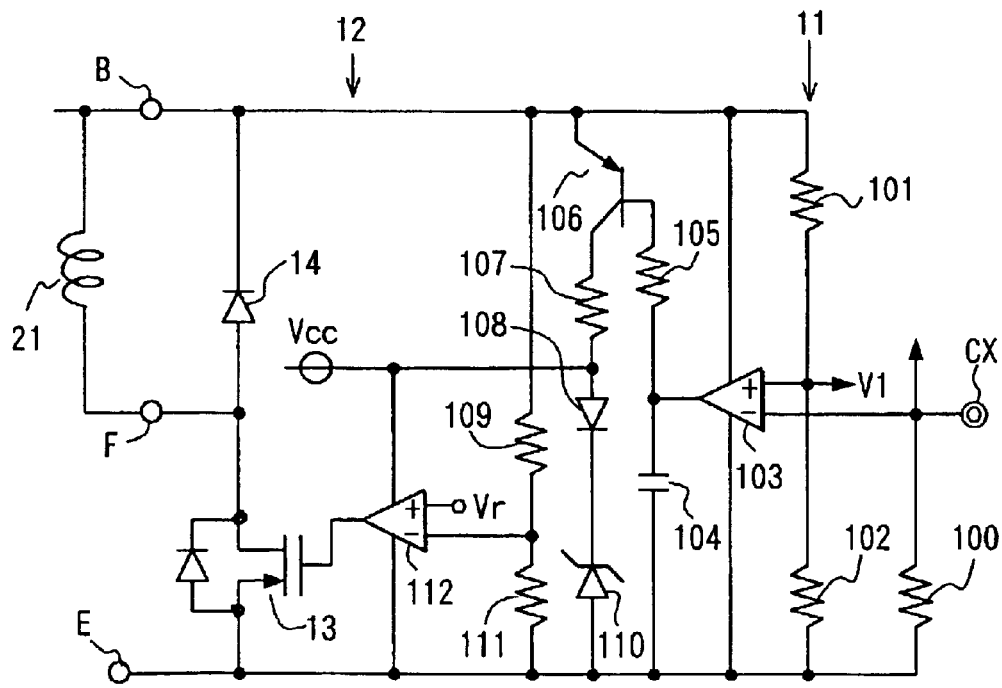
FIG. 3 is a circuit diagram showing a power supply circuit and a power generation control circuit according to the first embodiment of the present invention.

Referring to FIG. 2, the power supply circuit 11 has resistors 100, 101, 102, 104, 105 and 107, a voltage comparator 103, a capacitor 104, a diode 105, a transistor 106 and a zener diode 110. The control circuit 12 has resistors 109 and 111, and a voltage comparator 112. The resistor 100 is connected between the terminals CX and E. The resistors 101 and 102 form a voltage divider that determines a reference voltage V1. This reference voltage is inputted to a non-inverting terminal of the comparator 103 and to the receiver circuit 15.

An output terminal of the comparator 103 is connected to the base of the transistor 106 via the capacitor 104 and resistor 105. The comparator 103 controls the transistor 106. The resistor 107 is a limiting resistor that limits a current. The diode 108 and zener diode 110 produce a constant voltage. The resistors 109 and 111, connected to the inverting input terminal of the comparator 112, form a voltage divider that divides the voltage appearing at the terminal B.

The terminal of the comparator 112, to which a reference voltage Vr is applied, is connected to an output terminal of the receiver circuit 15. The output terminal of the comparator 112 is an output terminal of the control circuit 12 and connected to the switching device 13. The diode 14 is a flywheel diode connected between the ends of the field coil 21.

Figure 4:
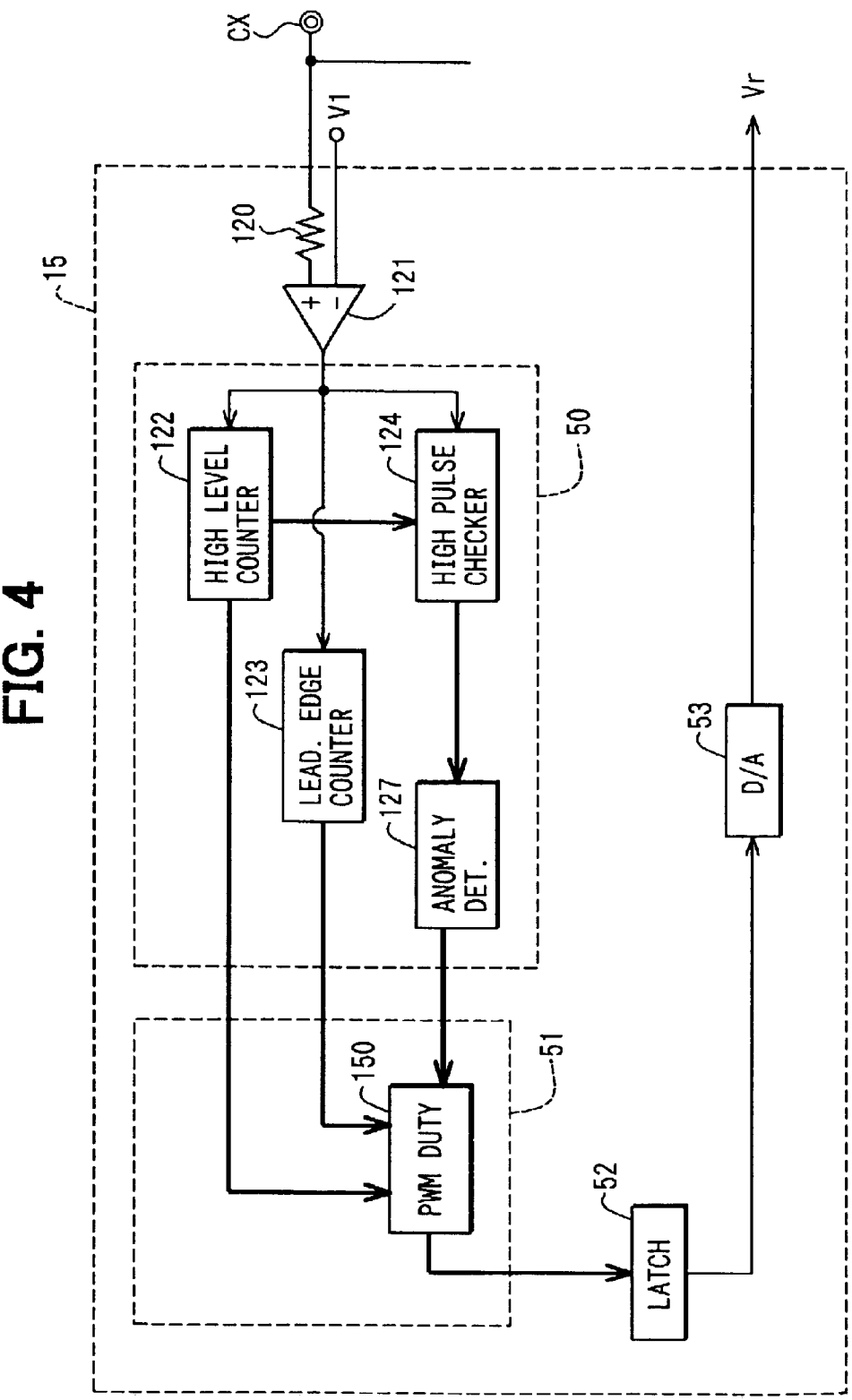
FIG. 4 is a circuit diagram showing an external signal receiver circuit according to the first embodiment of the present invention.

Referring to FIG. 4, the external signal receiver circuit 15 includes a determination circuit 50, a duty calculation circuit 51, a latch circuit 52 and a D/A converter 53. The determination circuit 50 has a high level pulse period counter 122, a leading edge cycle counter 123, a high level pulse period checker 124 and an anomaly determination circuit 127. The duty calculation circuit 51 has a pulse width modulation (PWM) duty calculation circuit 150.

The period counter 122 is connected to the output terminal of the comparator 121 and measures high level pulse period Th (FIG. 5) of the voltage pulse signals inputted to the terminal CX. The measured high level period value is sent to the PWM duty circuit 150 and checker 124. The cycle counter 123 measures a cycle period Tc (FIG. 5) between leading edges of the successively applied voltage pulse signals and sends the result to the PWM duty circuit 150. The checker 124 compares the measured pulse period Th inputted from the period counter 122 with the previous high level period.

If the result of the comparison is within the predetermined range, the checker 124 outputs a signal indicating normal condition. If the result is out of the predetermined range, the checker 124 outputs a signal indicating abnormal condition. This output signal is inputted to the anomaly determination circuit 127 and kept until the next signal is inputted. Then, this signal is sent to the PWM duty circuit 150.

The PWM duty circuit 150 calculates a duty of the pulse signal in synchronism with the leading edge of the pulse when the signal indicating normal condition is inputted. To determine the duty, the measured period of high level pulse (high pulse period) is divided by the measured period between leading edges of the pulses. The latch circuit 52 stores the calculation result and sends it to the D/A converter circuit 53. The D/A converter circuit 53 produces the reference voltage Vr corresponding to the calculated duty value. This reference voltage Vr is inputted to the non-inverting terminal of the comparator 112.

In the above embodiment, when the ignition switch 3 is closed, power is supplied to the ECU 5. The ECU 5 outputs a high level signal to the regulator 1 via the terminal CX. The comparator 103 receives the high level signal at the inverting terminal, and turns on the transistor 106 via the resistor 105 because this high level signal is higher than the reference V1. As a result, the comparator 112 turns on the switching device 13 and a voltage is applied to the field coil 21. The voltage is applied until the output voltage of the generator 2 reaches the predetermined voltage Vr by driving the switching device 13.

Figure 5:
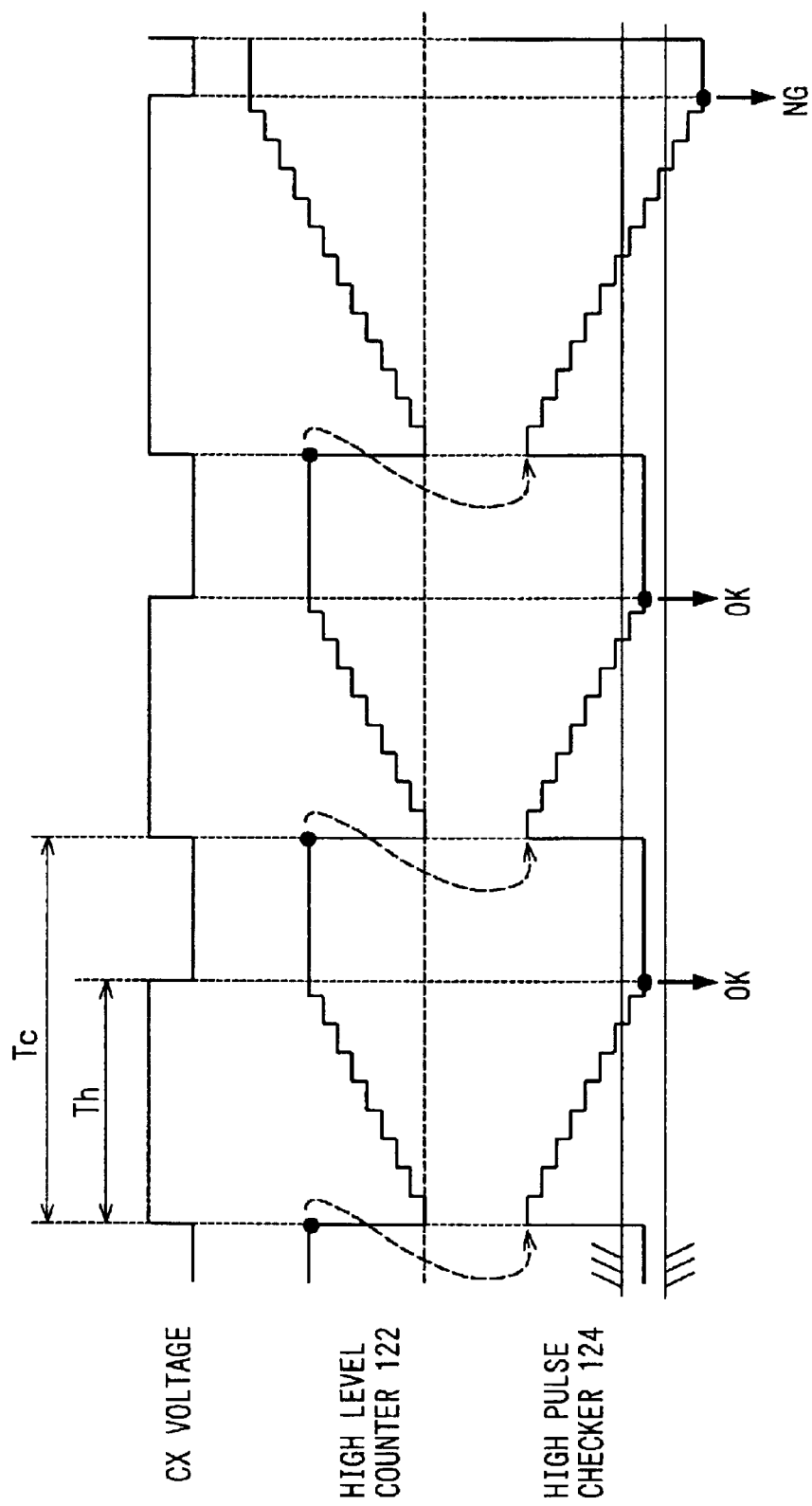
FIG. 5 is a signal diagram showing operation performed by a high level pulse period checker according to the first embodiment of the present invention.

When a PWM signal is inputted to the terminal CX via the internal impedance 30, a voltage appearing at the terminal CX is inputted to the non-inverting terminal of the comparator 121 via the resistor 120. The comparator 121 outputs the result of the comparison between the input voltage and reference voltage V1. The pulse width and pulse cycle period of this output is measured by the high level pulse period counter 122 and leading edge cycle counter 123, respectively. The operation of the counters 122 and 123 are shown in FIG. 5. The measured values are inputted to the PWM duty circuit 150 in response to the leading edge of the pulse.

The checker 124 compares the high level pulse period Th inputted from the comparator 121 with the previous high level pulse period. When the result of the comparison is within the predetermined range, the anomaly determination circuit 127 determines that the pulse signal is normal. As a result, it permits the PWM duty circuit 150 to perform a calculation. The result of the calculation is inputted to the comparator 112 via the latch circuit 52 and D/A converter circuit 53 as the reference voltage Vr indicative of the target voltage to which the generator output is regulated.

When the comparison result is out of the predetermined range, the anomaly determination circuit 127 determines that the pulse signal is not normal. As a result, it inhibits the calculation and the stored previous value is inputted to the comparator 112 as the reference voltage Vr. When a variation in the pulse period is out of the predetermined range, the regulator output voltage regulation is not performed based on the pulse signal. That is, the voltage regulation is performed based on the stored characteristic values. This ensures stable operations of the regulator 1 without being affected by transitory instability of the pulse signals.

When the pulse signal from the ECU 5 is split into two due to transitional noise, the high level pulse period Th varies sharply relative to the previous one. Therefore, the pulse signal is determined as abnormal and excluded from application to the regulator output voltage regulation. Also, when the duty value of the pulse signal from the ECU 5 varies transitionally, the signal is determined as abnormal and not used for the regulator output voltage regulation. The characteristic values determined by the normal pulse signals can be recognized by the regulator 1 by utilizing more than two pulses.

[Second Embodiment]

Figure 6:
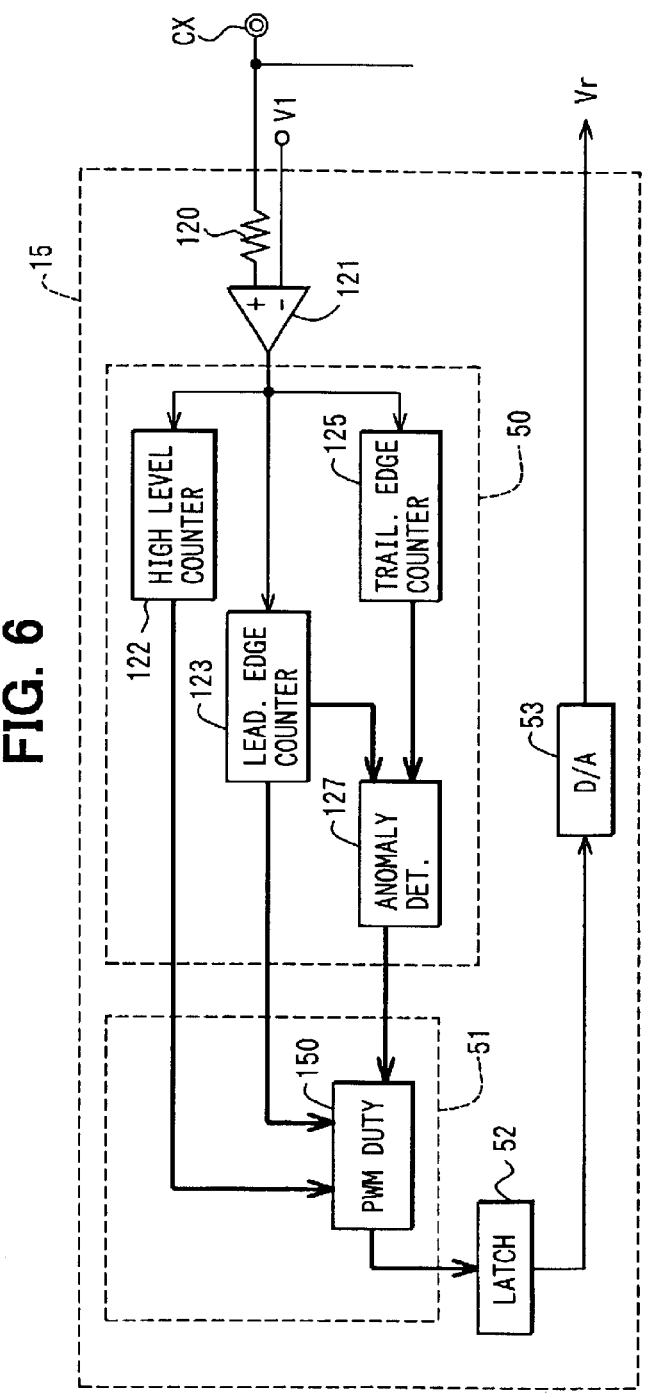
FIG. 6 is a circuit diagram showing a generator control system according to the second embodiment of the present invention.

In this embodiment, as shown in FIG. 6, the output of the leading edge cycle counter 123 is inputted to the PWM duty circuit 150 and anomaly determination circuit 127 at the leading edge time. As compared with FIG. 4, a trailing edge cycle counter 125 is included instead of the high level pulse checker 124. The cycle counter 125 measures a trailing edge cycle period and the measured value is inputted to the anomaly determination circuit 127.

The anomaly determination circuit 127 directs the PWM duty circuit 150 to perform calculation of duty value when the measured leading edge cycle period and trailing edge cycle period are within a predetermined range. When the cycle periods are out of the range, the anomaly determination circuit 127 determines that the pulse signal is not normal. As a result, it inhibits the PWM duty circuit 150 to perform the calculation.

Figure 7:
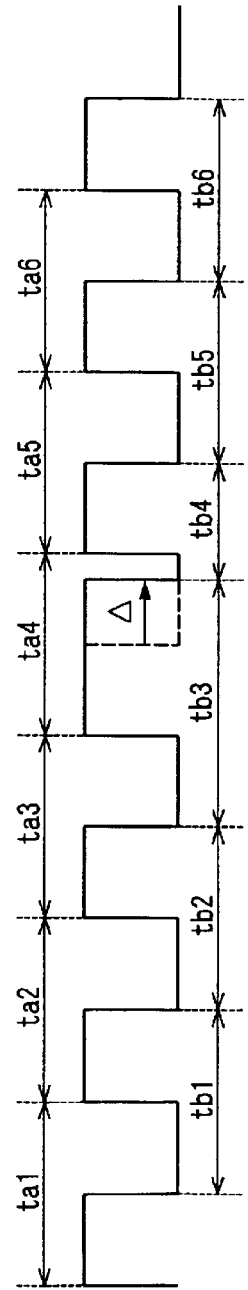
FIG. 7 is a signal diagram showing pulse periods and a variation in pulse width according to the second embodiment of the present invention.

An example of the pulse signal is shown in FIG. 7. Symbols ta1 through ta6 and tb1 through tb6 denote leading edge cycle periods and trailing edge cycle periods, respectively. The periods ta1 through ta6 are roughly the same length. When leading edge cycle periods are used, the pulse signal is determined as normal and the PWM duty circuit 150 is directed to perform duty value calculation.

The periods tb1, tb2, tb5 and tb6 are roughly the same length. However, the period tb3 is longer and the period tb4 is shorter than the period tb2 by the length indicated with Δ. When trailing edge cycle periods are used, the pulse signal is determined as abnormal for the periods tb3 and tb4. As a result, the PWM duty circuit 150 is inhibited to perform duty value calculation. This reduces characteristic variations.

The present invention should not be limited to the embodiments previously discussed and shown in the figures, but may be implemented in various ways without departing from the spirit of the invention. For instance, low level pulse period can be measured instead of the high level pulse period. Furthermore, to detect sharp variation in period of the high level pulse, inputs of the latch circuit can be controlled by detecting sharp variation in the results of the PWM duty calculation.

What is claimed is:

1. A voltage control system for a vehicular power generator, comprising:
    a voltage control circuit that controls a field current of the vehicular power generator so that an output voltage of the vehicular power generator is regulated to a desired voltage; and
    a receiver circuit that receives periodic voltage pulse signals from an external device via a signal line,
    wherein the receiver circuit periodically reads the voltage pulse signals, and
    wherein the voltage control circuit controls the field current utilizing characteristic values indicated by the voltage pulse signals only when a variation in a pulse width of the voltage pulse signals is within a predetermined range, wherein the pulse signal is determined as abnormal and excluded from application to field current control when variations in the pulse width are out of the range.

2. The voltage control system as in claim 1, wherein the receiver circuit periodically measures a pulse period of a predetermined level of the pulse signals, and
    wherein the receiver circuit controls the output voltage utilizing the characteristic values indicated by the voltage pulse signals only when the variations in the pulse period with respect to time are within the predetermined range.

3. The voltage control system as in claim 1, wherein the voltage control system reads successive two cycles of leading edges of the pulse signals, and controls the output voltage utilizing the characteristic values indicated by the voltage pulse signals only when the cycle is within the predetermined range.

4. The voltage control system as in claim 1, wherein the voltage control system reads any two cycles of trailing edges of the pulse signals, and controls the output voltage utilizing the characteristic values indicated by the pulse signals only when the cycle is within the predetermined range.

5. The voltage control system as in claim 1, wherein the voltage control circuit controls the field current regardless of the characteristic values indicated by the voltage pulse signals when the variation in the pulse width of the voltage pulse signals is out of the predetermined range.

6. The voltage control system as in claim 5, wherein the receiver circuit includes a determination means that determines whether the variation in the pulse width of the voltage pulse signals is within the predetermined range.

7. The voltage control system as in claim 6, wherein the voltage control circuit includes:
    a first control means that controls the field current regardless of the characteristic values indicated by the voltage pulse signals when the determination means determines that the variation in the pulse width of the voltage pulse signals is out of the predetermined range; and
    a second control means that controls the field current utilizing the characteristic values indicated by the voltage pulse signals when the variation in the pulse width of the voltage pulse signals is within the predetermined range.

8. The voltage control system as in claim 7, wherein:
    the voltage control circuit and the receiver are installed in the vehicular power generator; and
    the external device is installed outside the vehicular power generator.

9. A voltage control system for a vehicular power generator, comprising:
    a voltage control circuit that controls a field current of the vehicular power generator so that an output voltage of the vehicular power generator is regulated to a desired voltage; and
    a receiver circuit that receives periodic voltage pulse signals from external devices via a signal line,
    wherein the voltage control system periodically reads the voltage pulse signals, and controls the output voltage utilizing a stored characteristic value regardless of each characteristic value indicated with the voltage pulse signals when a variation in voltage pulse width is out of a predetermined range,
    wherein the voltage control circuit controls the field current utilizing the characteristic values indicated by the voltage pulse signals when the variation in the pulse width of the voltage pulse signals is within the predetermined range, the voltage control circuit and the receiver circuit are installed in the vehicular power generator, and the external device is installed outside the vehicular power generator.

10. The voltage control system as in claim 9, wherein the stored characteristic value is a characteristic value of the voltage pulse signal applied previously.

11. A control method for a vehicular power generator having a field coil and a stator coil, the control method comprising steps of:
    receiving in succession a pulse signal from an external device provided distantly from the power generator through a signal line, the pulse signal defining an output characteristic of the power generator;
    determining whether the pulse signal is normal or abnormal; and
    controlling a field current supplied to the field coil in correspondence with the output characteristic defined by the pulse signal when the pulse signal is determined as normal, and in correspondence with another output characteristic different from the output characteristic defined by the pulse signal when the pulse signal is determined as abnormal wherein the determining step includes steps of:
    measuring each pulse width of the pulse signal received in succession; and
    comparing two pulse widths in succession to determine that the pulse signal is normal and abnormal when a change in the two pulse widths is less than and more than a predetermined reference.

12. The control method as in claim 11, wherein the another output characteristic is the output characteristic defined by the pulse signal received previously.

13. A voltage control system for a vehicular power generator, comprising:

a voltage control circuit that controls a field current of the vehicular power generator so that an output voltage of the vehicular power generator is regulated to a desired voltage; and a receiver circuit that receives periodic voltage pulse signals from an external device via a signal line, wherein the receiver circuit periodically reads the voltage pulse signals, and wherein the voltage control circuit controls the field current utilizing characteristic values indicated by the voltage pulse signals only when a variation in a pulse width of the voltage pulse signals is within a predetermined range, the voltage control circuit controls the field current regardless of the characteristic values indicated by the voltage pulse signals when the variation in the pulse width of the voltage pulse signals is out of the predetermined range, the receiver circuit includes a determination means that determines whether the variation in the pulse width of the voltage pulse signals is within the predetermined range, and the voltage control circuit includes:

a first control means that controls the field current regardless of the characteristic values indicated by the voltage pulse signals when the determination means determines that the variation in the pulse width of the voltage pulse signals is out of the predetermined range; and a second control means that controls the field current utilizing the characteristic values indicated by the voltage pulse signals when the variation in the pulse width of the voltage pulse signals is within the predetermined range.

14. The voltage control system as in claim 13, wherein:

the voltage control circuit and the receiver are installed in the vehicular power generator; and the external device is installed outside the vehicular power generator.

* * * * *